(12) United States Patent
Moini et al.

(10) Patent No.: US 9,884,310 B2
(45) Date of Patent: Feb. 6, 2018

(54) SURFACE TREATMENT OF SUPERABSORBENTS

(71) Applicants: Nasrin Moini, Tehran (IR); Kourosh Kabiri Bamoradian, Tehran (IR); Mohammad Jalal-oddin Zohuriaan-Mehr, Tehran (IR)

(72) Inventors: Nasrin Moini, Tehran (IR); Kourosh Kabiri Bamoradian, Tehran (IR); Mohammad Jalal-oddin Zohuriaan-Mehr, Tehran (IR)

( * ) Notice: Subject to any disclaimer, the term of this patent is extended or adjusted under 35 U.S.C. 154(b) by 0 days.

(21) Appl. No.: 15/694,756

(22) Filed: Sep. 1, 2017

(65) Prior Publication Data
US 2018/0008960 A1    Jan. 11, 2018

Related U.S. Application Data

(63) Continuation of application No. 15/682,514, filed on Aug. 21, 2017.

(51) Int. Cl.
*B01J 20/32* (2006.01)
*B01J 20/26* (2006.01)
*B01J 20/30* (2006.01)

(52) U.S. Cl.
CPC ......... *B01J 20/3231* (2013.01); *B01J 20/267* (2013.01); *B01J 20/3078* (2013.01)

(58) Field of Classification Search
CPC ...... B01J 20/32; B01J 20/3231; B01J 20/267; B01J 20/3078

USPC .................................................. 502/400, 401
See application file for complete search history.

(56) References Cited

U.S. PATENT DOCUMENTS

| | | |
|---|---|---|
| 5,061,487 A | 10/1991 | Blank et al. |
| 5,331,059 A | 7/1994 | Engelhardt et al. |
| 2007/0129517 A1 | 6/2007 | Lang et al. |
| 2014/0155259 A1 | 6/2014 | Tian et al. |
| 2014/0309607 A1 | 10/2014 | Richlen et al. |
| 2015/0252130 A1 | 9/2015 | Loick et al. |
| 2016/0060418 A1 | 3/2016 | Tian et al. |

OTHER PUBLICATIONS

D. S. Franklin, Performance of silane-coupling agent-treated hydroxyapatite/diethylene glycol-based pH-sensitive biocomposite hydrogels, Iranian Polymer Journal, Oct. 2014, vol. 23, Issue 10, pp. 809-817.
D. S. Franklin, Substantial performance of silane surface treated 1, 4 butane diol /hydroxyapatite biocomposite hydrogels for dye removal applications, American Journal of Chemistry and Materials Science, Jan. 30, 2015, vol. 1, Issue 4, pp. 24-29.

*Primary Examiner* — Edward Johnson
(74) *Attorney, Agent, or Firm* — NovoTechIP International PLLC

(57) ABSTRACT

A method for surface treatment of acrylate-based superabsorbents may include preparing a treatment solution including water, an organic solvent, and a silane compound; applying the treatment solution to a plurality of acrylate-based superabsorbents to form a mixture; and fabricating modified acrylate-based superabsorbents by subjecting the mixture to heating or microwave irradiation.

14 Claims, 17 Drawing Sheets

SURFACE TREATMENT OF SUPERABSORBENTS

CROSS-REFERENCE TO RELATED APPLICATION

This application is a continuation of pending U.S. patent application Ser. No. 15/682,514, filed on Aug. 21, 2017, and entitled "SURFACE TREATMENT OF SUPERABSORBENTS," which is incorporated herein by reference in its entirety.

TECHNICAL FIELD

The present disclosure generally relates to the field of superabsorbents, particularly to a method for surface treatment of superabsorbents, and more particularly to a method for surface treatment of acrylate-based superabsorbents with a silane compound.

BACKGROUND

Superabsorbent polymers (SAPs) are generally capable of absorbing and retaining amounts of aqueous fluids equivalent to many times their own weight. After absorption of an aqueous solution, swollen SAP particles become very soft and they may be deformed easily. Upon deformation, the void spaces between the SAP particles may be blocked which may increase the flow resistance for liquids. This is generally referred as "gel-blocking".

SAP particles may include a partially neutralized lightly cross-linked polyacrylic acid network, which is a hydrophilic network and permits swelling of the network once submerged in water or any aqueous solutions. The cross links between the polymeric chains may assure that the SAPs do not dissolve in water. SAPs applied in form of small particles, such as fibers or granules.

One way to reduce gel-blocking is to make the SAP particles stiffer, which enables the SAP particles to retain their original shape thus creating or maintaining void spaces between the particles.

Low swollen gel strength and the adverse effects of gel-blocking are two major challenges of the superabsorbents. Therefore, there is a need in the art to provide SAP particles with a high degree of surface cross-linking in order to avoid gel-blocking and to have a high swollen gel strength.

SUMMARY

In one general aspect, the present disclosure describes a method for surface treatment of superabsorbents. The method may include: preparing a treatment solution; applying the treatment solution to a plurality of acrylate-based superabsorbents to form a mixture; and fabricating modified acrylate-based superabsorbents by subjecting the mixture to heating or microwave irradiation.

According to some exemplary implementations, the treatment solution may further include an additive which may be selected from aluminum sulfate, aluminum chloride, benzyl amine compounds, imidazole compounds, methyl imidazole, dimethyl octadecyl [3-(tri methoxysilyl)propyl] ammonium chloride, aniline compounds, p-toluene sulfonic acid, sodium hypophosphite, or combinations thereof. Moreover, the additive may be present in the treatment solution in an amount of between 0.001% and 1% of the weight of the superabsorbent.

According to some exemplary implementations, the superabsorbents may be acrylate-based superabsorbents, and they may be one of the porous superabsorbents, non-porous superabsorbents, or combinations thereof. Moreover, the silane compound may be epoxy silane compound and the concentration ratio (weight/weight) of the silane compound and the superabsorbents may be between 0.1:1 (wt/wt) and 1:100 (wt/wt).

According to an exemplary implementation, the epoxy silane compound may be selected from 3-[(2, 3-epoxypropoxy)-propyl]-trimethoxy silane, 3-glycidyloxypropyl triethoxy silane, 3-glycidyloxy propyl trimethoxy silane, 3,4 epoxy cyclohexyl-ethyl trimethoxy silane, glycidoxy propyl-trimethoxy silane r-glycidoxy propyl-methyli diethoxy silane, or combinations thereof.

According to some exemplary implementations, the organic solvent may be selected from acetone, ethanol, methanol, dimethyl sulfoxide (DMSO), dimethyl formamide (DMF), or combinations thereof. Moreover, the concentration ratio (weight/weight) of water and organic solvent may be between 5:95 (wt/wt) and 50:50 (wt/wt).

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Surface crosslinking is an approach to improve superabsorbents strength in particle form. This strategy may be efficient for hydrophilic polymers; therefore, the lightly cross-linked partially neutralized polyacrylic acid may be a great media for surface treatment owing to carboxylic acid pendant groups. The present disclosure is a method for surface treatment of acrylate-based superabsorbent polymers (SAPs) using a silane compound as a surface modifier. Surface treatment of acrylate-based superabsorbent may be done through two mechanisms of creating interpenetrating polymer network (IPN) of oligomeric siloxane and crosslinking of the silane compound and the SAP particles.

Figure 1:
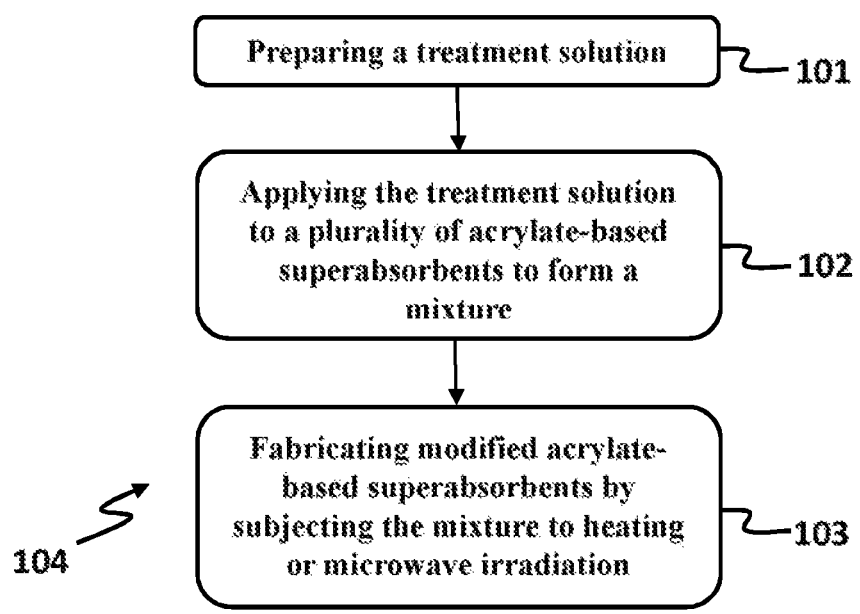
FIG. 1 illustrates a method for surface treatment of acrylate-based superabsorbents, according to one implementation of the present disclosure.

FIG. 1 illustrates a method 100 for surface treatment of acrylate-based superabsorbents, according to one or more aspects of the present disclosure. Method 100 may include a step 101 of preparing a treatment solution; a step 102 of applying the treatment solution to a plurality of acrylate-based superabsorbents to form a mixture; and a step 103 of fabricating modified acrylate-based superabsorbents by subjecting the mixture to heating or microwave irradiation.

Referring to FIG. 1, in an implementation, in step 101, a treatment solution including water, an organic solvent, and a silane compound may be prepared. At first, a predefined amount of epoxy silane compound as a silane compound may be added to the predefined amount of deionized water temperature and stirred for at most 5 hours in order to hydrolysis the epoxy silane compound. The epoxy silane compound hydrolysis may be done at room temperature and final pH may be between about 3 and about 7.

According to some implementations, the epoxy silane compound may be selected from the group consisting of 3-[(2, 3-epoxypropoxy)-propyl]-trimethoxy silane, 3-glycidyloxypropyl triethoxy silane, 3-glycidyloxy propyl trimethoxy silane, 3,4 epoxy cyclohexyl-ethyl trimethoxy silane, glycidoxy propyl-trimethoxy silane r-glycidoxy propyl-methyli diethoxy silane, and combinations thereof.

After that, the organic solvent may be added to the epoxy silane solution, while the epoxy silane solution may be agitated gently. According to some exemplary implementations, the concentration ratio (weight/weight) between water and the organic solvent may be between 5:95 (wt/wt) and 50:50 (wt/wt). The organic solvent may be selected from a group consisting of acetone, ethanol, methanol, dimethyl sulfoxide (DMSO), dimethyl formamide (DMF), and combinations thereof.

Referring again to FIG. 1, in step 102, after preparing the treatment solution, the treatment solution may be applied to the polymeric chains of the acrylate-based superabsorbents. Applying the treatment solution to the acrylate-based superabsorbents may be done in different processes such as wicking process, soaking process, spraying process, or combinations thereof. In this step, the treatment solution may be applied to acrylate-based superabsorbents, and the acrylate-based superabsorbents particles may be incubated at room temperature for at most 1 hour to form a mixture.

Also, the mixture may include some additives such as aluminum sulfate, aluminum chloride, benzyl amine compounds, imidazole compounds, methyl imidazole, dimethyl octadecyl [3-(tri methoxysilyl)propyl] ammonium chloride, aniline compounds, p-toluene sulfonic acid, sodium hypophosphite, and combinations thereof. Also, the additive may be present in the treatment solution in an amount of between 0.001% and 1% of the weight of the superabsorbent.

Referring again to FIG. 1, in step 103, modified acrylate-based superabsorbents may be fabricated by subjecting the mixture to heating or microwave irradiation in a condensation process. The condensation process of this step may be done by heating the mixture including the acrylate-based superabsorbents particles and the treatment solution, irradiating microwaves to the mixture including the acrylate-based superabsorbents particles and the treatment solution, or combinations thereof.

According to some implementations, the heating process may be done by using an oven at a temperature of about between 25° C. and 100° C., and for a duration of about between 15 minutes and 3 hours. The microwave radiation may be done by using a microwave oven with a power of at most 1000 Watt, and a duration of about between 2 minutes and 15 minutes.

EXAMPLES

The following examples describe an implementation of the method of the present disclosure for surface treatment of acrylate-based superabsorbents. The following examples further describe characterization tests performed on the modified acrylate-based superabsorbents to study and compare the effect and amount of silane groups on the surface of acrylate-based superabsorbents modified by the present method.

Example 1: Surface Treatment of Acrylate-Based Superabsorbents

In this example, surface treatment of acrylate-based superabsorbents was done through the following steps. A treatment solution including water, an organic solvent, and a silane compound was prepared as follows. At first, 1 gram of 3-[(2, 3-epoxypropoxy)-propyl]-trimethoxy silane as an epoxy silane compound was added to the 2 gram of deionized water and stirred for 2 hours in order to hydrolysis the epoxy silane. The epoxy silane hydrolysis was done at room temperature and final pH was about 5. After that, 18 gram of acetone as an organic solvent was added to the epoxy silane solution, while the epoxy silane solution was agitated gently. The concentration ratio (weight/weight) between water and the acetone was about 90:10 (wt/wt).

After preparing the treatment solution, the treatment solution was applied to 2 gram of acrylate-based superabsorbent in order to penetrate the polymeric chains of the acrylate-based superabsorbents. Applying the treatment solution to the acrylate-based superabsorbents was done in a soaking process; then, the acrylate-based superabsorbents particles was incubated at room temperature for about 30 minutes to form a mixture.

After obtaining a mixture including the acrylate-based superabsorbents particles and the treatment solution, a plurality of modified acrylate-based superabsorbents was obtained in a condensation process. The condensation process of this step was done by heating the mixture including the acrylate-based superabsorbents particles and the treatment solution, irradiating microwaves to the mixture including the acrylate-based superabsorbents particles and the treatment solution, or combinations thereof.

TABLE 1 illustrates representative parameters for surface modification of the non-porous acrylate-based superabsorbent samples through heating. These representative parameters are method of treatment, amount of modified SAP, amount of epoxy silane (EPS), the ratio between acetone and deionized water, required amount of treatment solution, additives, heating temperature, absorbency under load (AUL), and saline solution absorbance capacity ($Q_s$).

These representative parameters are amount of modified SAP, amount of epoxy silane (EPS), the ratio between acetone and deionized water, additives, heating temperature, absorbency under load (AUL), and saline solution absorbance capacity ($Q_s$).

TABLE 2

Surface modification of the porous acrylate-based superabsorbents:

| Sample Code | Modified SAP (g) | EPS Content (g) | Acetone:DW | T (° C.) | AUL (g/g) | Qs (g/g) |
|---|---|---|---|---|---|---|
| 8 | — | — | — | — | 11.47 | 45 |
| 9 | 2 | 1 | 17.1:1.9 | 120 | 18.95 | 31.3 |
| 10 | 27 | 1 | 9:3 | 120 | 13 | 54 |

TABLE 3 illustrates representative parameters for surface modification of the porous acrylate-based superabsorbents with different neutralization degree of acrylic acid. These representative parameters are method of treatment, final amount of modified SAP, amount of epoxy silane (EPS), the ratio between acetone and deionized water, required amount of treatment solution, other additives, and heating temperature.

TABLE 1

Surface modification of the non-porous acrylate-based superabsorbents:

| Sample Code | Method of Treatment | Modified SAP (g) | Epoxy silane (g) | Acetone:DW | Treatment Solution (g) | Additives | T (° C.) | AUL (g/g) | Qs (g/g) |
|---|---|---|---|---|---|---|---|---|---|
| 1 | — | — | — | — | — | — | — | 16 | 45 |
| 2 | Soaking | 1 | 1 | 90:10 | 19 | — | 140 | 30 | 31 |
| 3 | Spraying | 5 | 1 | 70:30 | 5 | — | 140 | 40 | 45 |
| 4 | Spraying | 5 | 1 | 90:10 | 5 | — | 140 | 33 | 47 |
| 5 | Spraying | 30 | 1 | 70:30 | 10 | AlCl$_3$ | 120 | 23 | 42 |
| 6 | Spraying | 100 | 5 | 70:30 | 50 | AlCl$_3$ | 120 | 19 | 40 |
| 7 | Spraying | 100 | 5 | 70:30 | 50 | AlCl$_3$ | 140 | 40 | 40 |

TABLE 2 illustrates representative parameters for surface modification of the porous acrylate-based superabsorbents.

TABLE 3

Surface modification of the porous acrylate-based superabsorbents with different neutralization degree of acrylic acid:

| Sample Code | Neutralization Degree (%) | Modified SAP (g) | Acetone:DW | EPS Content (g) | T (° C.) | AUL (g/g) | Qs (g/g) |
|---|---|---|---|---|---|---|---|
| 11 | 90 | — | — | — | — | 9.543 | 90.028 |
| 12 | 90 | 2 | 17.1:1.9 | 1 | 120 | 22.05 | 49.23 |
| 13 | 75 | | | | | 12.133 | 69.46 |
| 14 | 75 | 2 | 17.1:1.9 | 1 | 120 | 23.9 | 51.56 |
| 15 | 65 | | | | | 12.224 | 65.92 |
| 16 | 65 | 2 | 17.1:1.9 | 1 | 120 | 25.80 | 50.96 |

TABLE 3-continued

Surface modification of the porous acrylate-based superabsorbents with different neutralization degree of acrylic acid:

| Sample Code | Neutralization Degree (%) | Modified SAP (g) | Acetone:DW | EPS Content (g) | T (° C.) | AUL (g/g) | Qs (g/g) |
|---|---|---|---|---|---|---|---|
| 17 | 50 | | | | | 12.74 | 54.65 |
| 18 | 50 | 2 | 17.1:1.9 | 1 | 120 | 22.89 | 60.83 |
| 19 | 40 | | | | | 12.706 | 57.85 |
| 20 | 40 | 2 | 17.1:1.9 | 1 | 120 | 20.89 | 41.256 |
| 21 | 25 | | | | | 11.926 | 36.817 |
| 22 | 25 | 2 | 17.1:1.9 | 1 | 120 | 18.695 | 36.34 |
| 23 | 10 | | | | | 8.906 | 16.976 |
| 24 | 10 | 2 | 17.1:1.9 | 1 | 120 | 6.016 | 15.126 |

TABLE 4 illustrates representative parameters for surface modification of the acrylate-based superabsorbents using microwave irradiation. These representative parameters are amount of modified SAP, amount of epoxy silane (EPS), the ratio between acetone and deionized water, additives, microwave radiation power, absorbency under load (AUL), saline solution absorbance capacity ($Q_s$).

TABLE 4

Surface modification of the acrylate-based superabsorbents using microwave irradiation:

| Sample Code | Modified SAP (g) | EPS Content (g) | Acetone (g):DW (g) | Additives | Power (W) | AUL (g/g) | Qs (g/g) |
|---|---|---|---|---|---|---|---|
| 25 | — | — | — | — | — | 9.75 | 73.3 |
| 26 | 10 | 0.5 | 3.5:1.5 | AlCl$_3$ | 250 | 22.54 | 45 |
| 27 | 5 | 0.5 | 17.1:1.9 | AlCl$_3$ | 250 | 18.44 | 51.71 |

Example 2: Water Absorption Capacity and Absorbency Under Load (AUL)

In this example, water absorption capacity and absorbency under load (AUL) of the modified and non-modified acrylate-based superabsorbents were measured. In order to measure the water absorption capacity, free swelling capacity values were measured using the tea-bag analysis.

At first, about 0.1 gram powder of acrylate-based superabsorbents was placed inside a tea-bag and permitted to freely swell in 100 milliliters of deionized water or NaCl saline solution with a concentration of about 0.9% (weight/volume) at room temperature for a duration of about 30 minutes, and a sponge was applied to dry the remained aqueous.

After that, swelling capacity of the acrylate-based superabsorbents was calculated in gram of absorbed water/gram of dried SAP (g/g) through the following equation. $Q_s=(W_s-W_d)/W_d$, where $W_D$ and $W_s$ stand for weights of initial dry samples and swollen SAP, respectively.

In this example, also in order to measure the absorbency under load of acrylate-based superabsorbents, about 0.25 gram of acrylate-based superabsorbents was uniformly dispersed on the surface of a polyester gauze; and the polyester gauze was located on a macro-porous glass filter plate which had been placed in a Petri dish.

After that, a cylindrical solid load with a diameter of about 60 millimeters was put on SAP particles and it applied a pressure of about 0.3 psi to the dry SAP particles, while the SAP particles could freely be slipped in the Petri dish. Then saline solution with a concentration of about 0.9% (weight/volume) was added to the Petri dish in an amount that the SAP particles were completely covered with the saline solution, and after 90 minutes, the maximally swollen particles were removed and re-weighed.

The AUL values were calculated via the following equation. $AUL=(W_s-W_d)/W_d$, where $W_d$ and $W_s$ stand for weights of initial dry samples and swollen SAP, respectively.

The saline solution absorbance capacity ($Q_s$) and the absorbency under load (AUL) of the non-porous acrylate-based superabsorbent samples are reported in TABLE 1.

Referring to TABLE 1, the AUL values of the modified samples with sample codes of 2 to 7 were increased significantly in comparison with intact SAP with a code sample of 1. Also, gel strength index of SAP sample which is defined as a ratio of AUL and $Q_s$ is increased in the modified samples.

The saline solution absorbance capacity ($Q_s$) and the absorbency under load (AUL) of the porous acrylate-based superabsorbent samples are reported in TABLE 2. Referring to TABLE 2, the AUL values of the modified samples with sample codes of 9 and 10 were increased significantly in comparison with intact SAP sample with a code sample of 8. Also, gel strength index of SAP sample which is increased in the modified samples.

The saline solution absorbance capacity ($Q_s$) and the absorbency under load (AUL) of the porous acrylate-based superabsorbent samples with different neutralization degree of acrylic acid are reported in TABLE 3. Referring to TABLE 3, the AUL values of the modified samples with sample codes of 12, 14, 16, 18, 20, 22, and 24 were increased significantly in comparison with intact SAPs with code samples of 11, 13, 15, 17, 19, 21, and 23. Also, gel strength index of SAP sample is increased in the modified samples.

The saline solution absorbance capacity ($Q_s$) and the absorbency under load (AUL) of the acrylate-based superabsorbent samples which were modified using microwave radiation are reported in TABLE 4. Referring to TABLE 4, the AUL values of the modified samples with sample codes of 26 and 27 were increased significantly in comparison with intact SAP with a code sample of 25. Also, gel strength index of SAP sample is increased in the modified samples.

Example 3: Dynamic Mechanical Analysis

In this example, dynamic mechanical analysis of acrylate-based superabsorbents was performed by using a physical oscillatory rheometer (MCR 300, Germany). The rheological measurements of the samples were done at a temperature of about 25° C. with a parallel plate geometry, where the plate diameter was about 25 millimeters with a gap of about 3 millimeters.

All the measurements were performed on the swelled samples which absorbed about 25 grams of DW per gram of the superabsorbent. After that, the storage modulus (G') was recorded as a function of angular frequency in the linear viscoelastic zone with a constant shear strain of about 0.2%.

Figure 2:
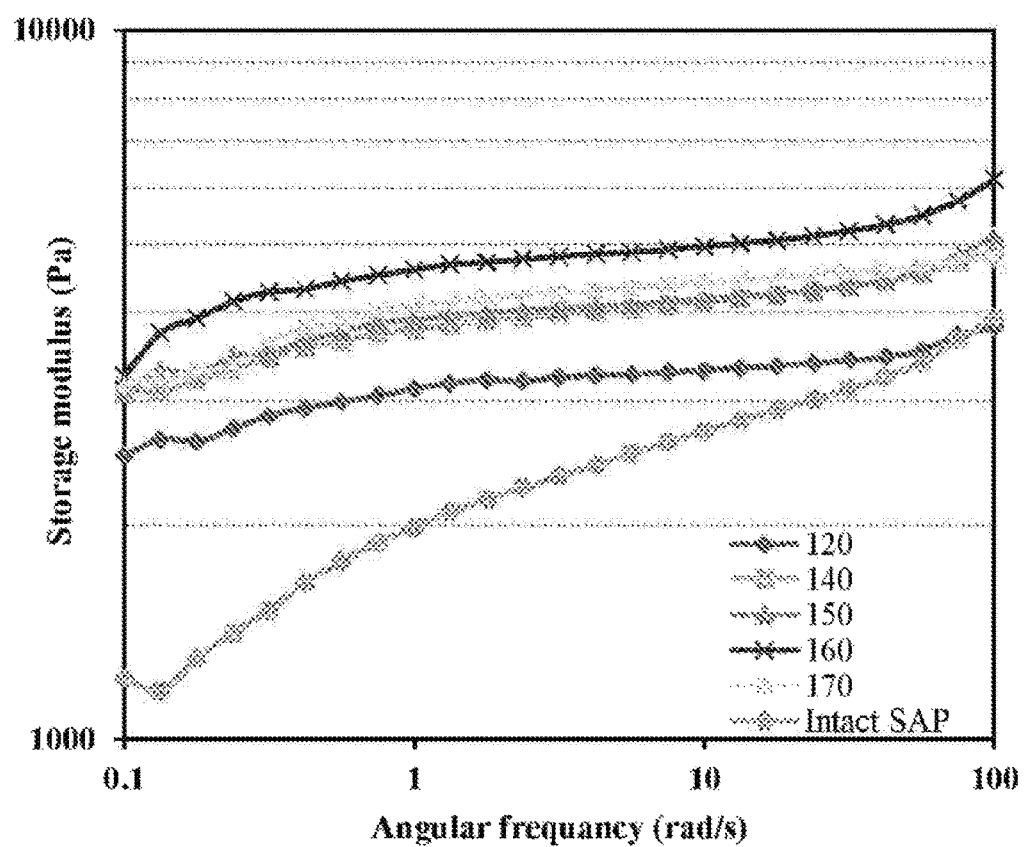
FIG. 2 illustrates the storage modulus as a function of angular frequency for the samples modified at different temperatures, according to an implementation of the present disclosure.

FIG. 2 illustrates the storage modulus (G') as a function of angular frequency for the samples, which were modified at different temperatures with a heating time of about 2 hours. Referring to FIG. 2, the storage modulus (G') of all of the modified SAP samples were significantly increased in comparison with the intact sample at angular frequencies lower than 100 rad/s; therefore, the mechanical behavior of the modified sample become more elastic comparing to intact SAPs.

Also, storage modulus of all samples has been increased by increasing the treatment temperature up to 160° C., and the SAP sample which was treated at 160° C. has the maximum storage modulus, which was about 4590 Pa. The raise in modulus by temperature could be attributed to more crosslinking reaction, siloxane network formation and hydroxyl group side reactions which needs elevated temperature to be done.

Increasing the storage modulus has been stopped for the sample which was treated at 170° C. However, at this temperature its storage modulus is still 100% above of the storage modulus of the intact sample measured at 1 rad/s. At elevated temperature like 170° C., the modulus dropped. This could be assigned to triggering dehydration and consuming carboxylic acid groups to form anhydride, instead of their participating in surface desired reactions. Besides, at elevated temperatures, thermal degradation is also gradually started leading to lower the storage modulus.

Figure 3:
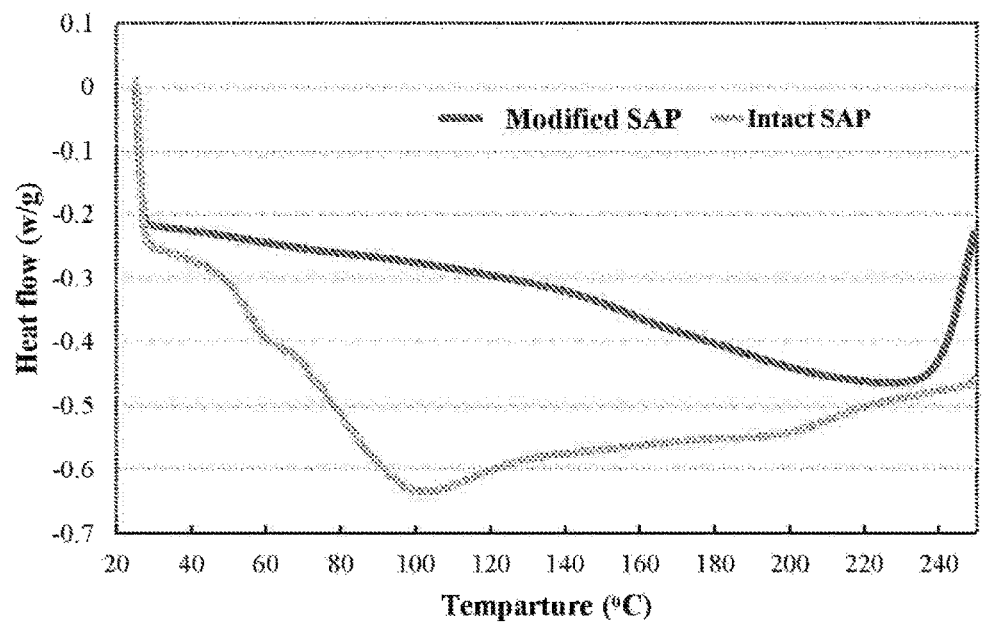
FIG. 3 illustrates differential scanning calorimetry (DSC) curves of intact acrylate-based superabsorbents sample and modified acrylate-based superabsorbents sample, according to an implementation of the present disclosure.

Differential scanning calorimetry (DSC) is used widely for examining polymeric materials to determine their thermal transitions. The observed thermal transitions can be utilized to compare materials, although the transitions do not uniquely identify composition. FIG. 3 illustrates differential scanning calorimetry (DSC) curves of intact acrylate-based superabsorbents sample and modified acrylate-based superabsorbents of sample code 2.

Referring again to FIG. 3, illustrates the glass transition temperatures ($T_g$) of intact SAP and modified SAP. The intact SAP have two $T_g$ at 54.82° C. and 82.42° C., while the $T_g$ of modified sample has increased significantly to 153.84° C.

Example 4: Silicon Mapping on the Surface of Modified Acrylate-Based Superabsorbents In this example, the surface morphology of SAP particles was studied by using a Vega-TESCAN (Brno, Czech Republic) scanning electron microscope (SEM), which was operated in the secondary electron mode at 20 kV. Tracking of the EPS has been reported in following EDX-SEM studies; therefore, Si-element mapping was used to determine the Si content on the surface and bulk of the modified acrylate-based superabsorbent samples using SEM equipped with energy dispersive X-ray analyses (EDX).

At first, the sample was placed on an aluminium plate, which was mounted on a conductive SEM stage. After that, the acrylate-based superabsorbent sample was sputter coated with a thin layer of gold with a thickness of about 15 nanometers, and then it was mapped in the secondary electron mode at 20 kV. After that, for obtaining a better resolution and tracking epoxy silane with a good efficiency, particles were separated in two categories based on their particle: one category from 150 to 500 μm particle size and the other category with a particle size above 500 μm. For surface analysis, the acrylate-based superabsorbent sample was mounted on the SEM stage; and for cross-section analysis the sample was casted in an epoxy resin and its curing agent. After complete curing the resin, it was broken into smaller particles by liquid nitrogen and their cross-sections were analysed to explore individual inner parts of superabsorbent particles.

Figure 4A:
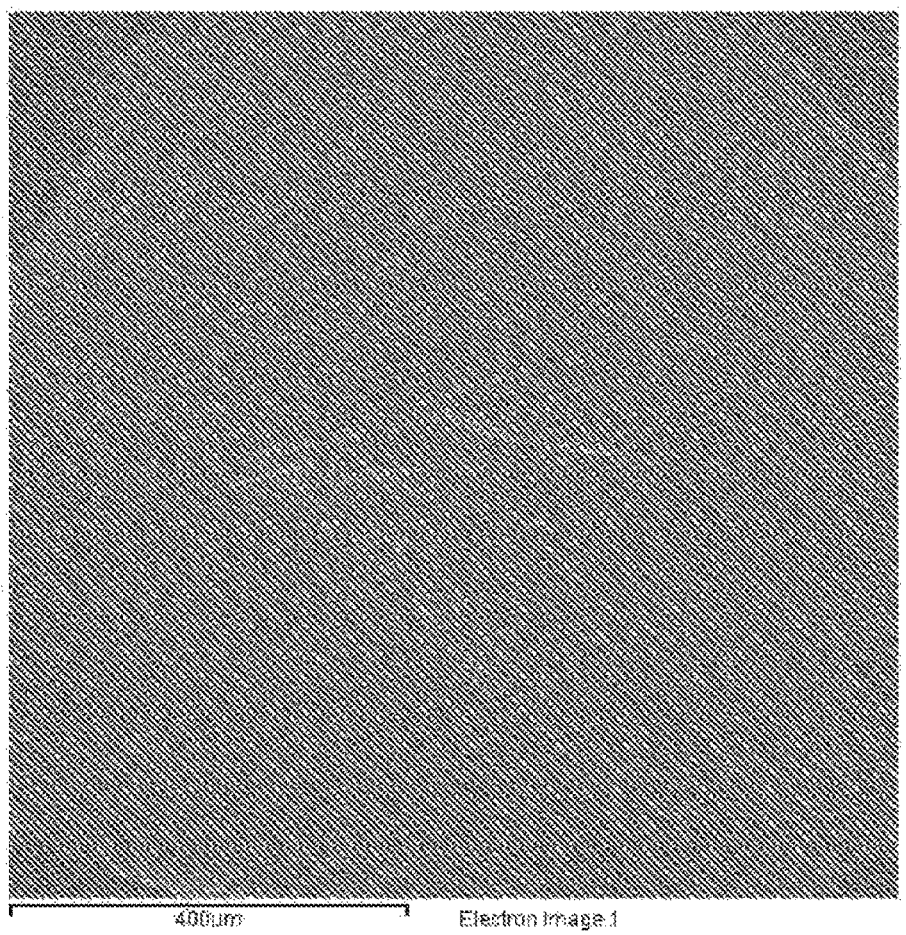
FIG. 4A illustrates the SEM-EDX silicon mapping of intact acrylate-based superabsorbent sample, according to an implementation of the present disclosure.
Figure 4B:
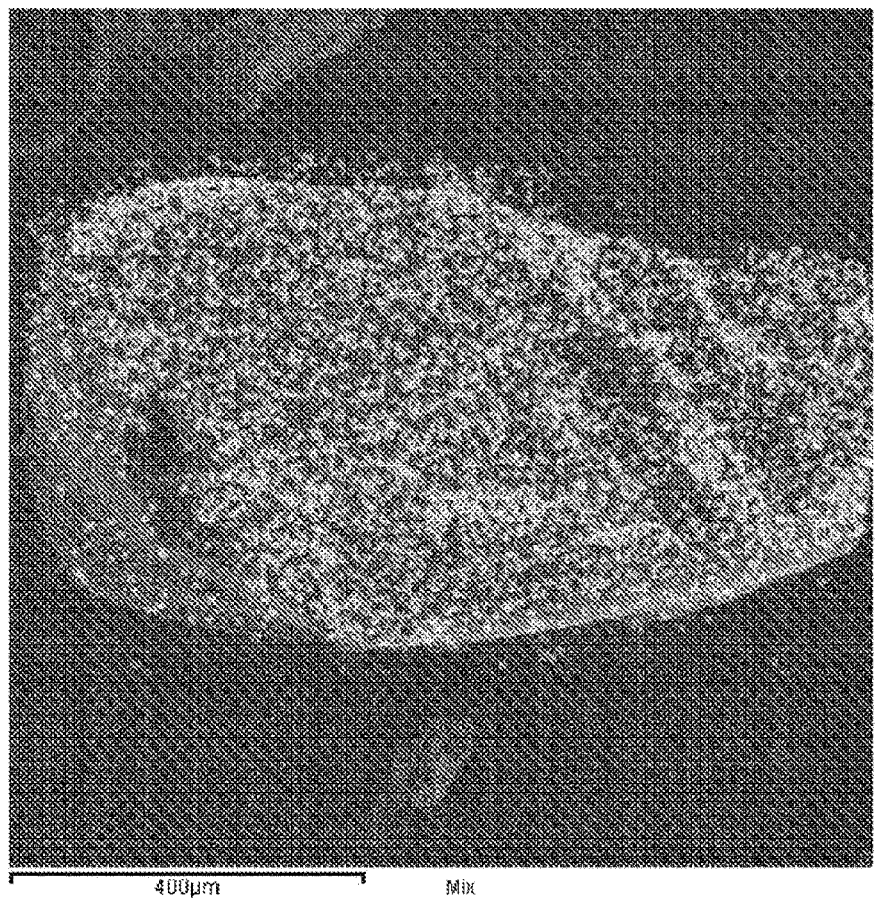
FIG. 4B illustrates the SEM-EDX silicon mapping of modified acrylate-based superabsorbent sample, according to an implementation of the present disclosure.

FIG. 4A illustrates the SEM-EDX silicon mapping of SAP particles for intact acrylate-based superabsorbent sample code 1 of TABLE 1, which does not have any silicon particles. FIG. 4B illustrates the SEM-EDX silicon mapping of SAP particles for acrylate-based superabsorbent sample code 2 of TABLE 1, which was modified in a soaking method.

Referring to FIG. 4B, the SEM-EDX mappings of modified SAP particles with a diameter of more than 500 μm show average 0.45% to 0.47% of atomic percentages of silicon on the surface of the SAP particles.

In SAP particles with a smaller diameter, presence of water in the treatment solution causes slight hydration on the surface of the SAP particles which results in more particle adhesion due to the hydrogen bonds. This leads to slightly different pattern of diffusion for EPS reactant into the outermost layers of the superabsorbents' surface. Also, the mapping pattern shows a homogenous crosslinking on the surface of the acrylate-based superabsorbent sample code 2, which was modified with a soaking method.

Figure 4C:
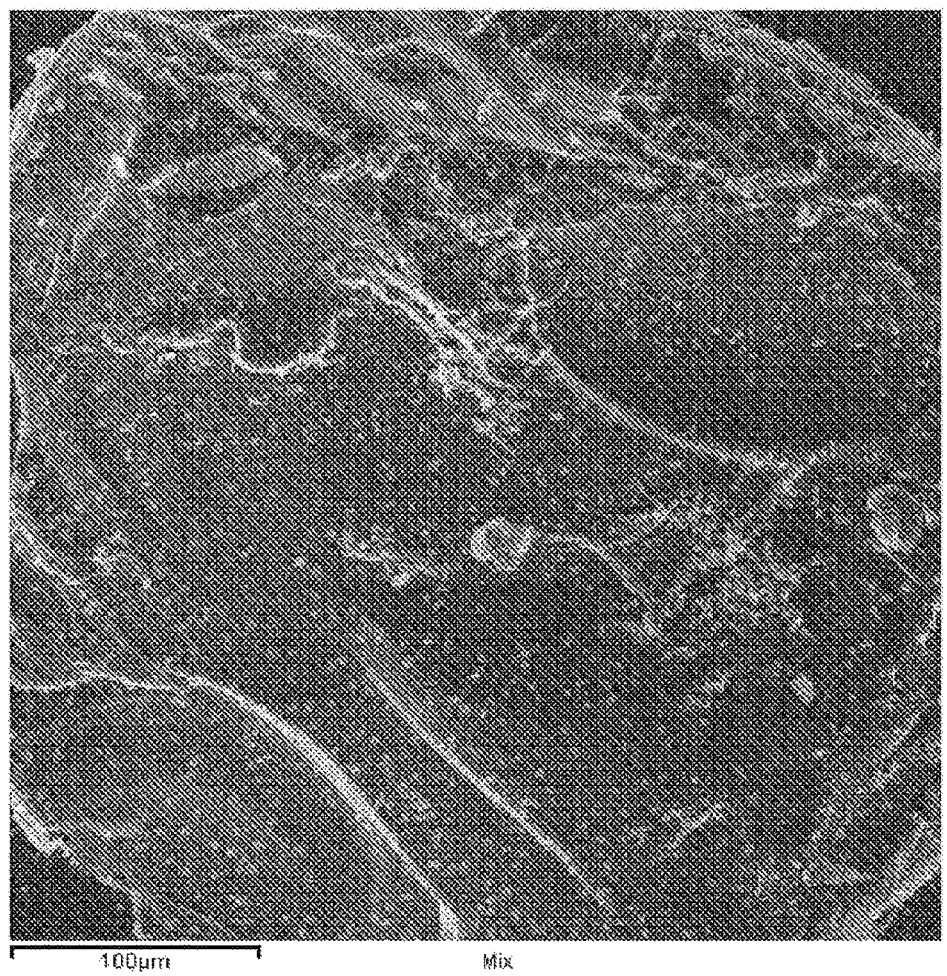
FIG. 4C illustrates the SEM-EDX silicon mapping of modified acrylate-based superabsorbent sample, according to an implementation of the present disclosure.

FIG. 4C illustrates the SEM-EDX silicon mapping of SAP particles for acrylate-based superabsorbent sample code 3 of TABLE 1, which is modified in a spraying method with a ratio of acetone to water of 70:30.

Figure 4D:
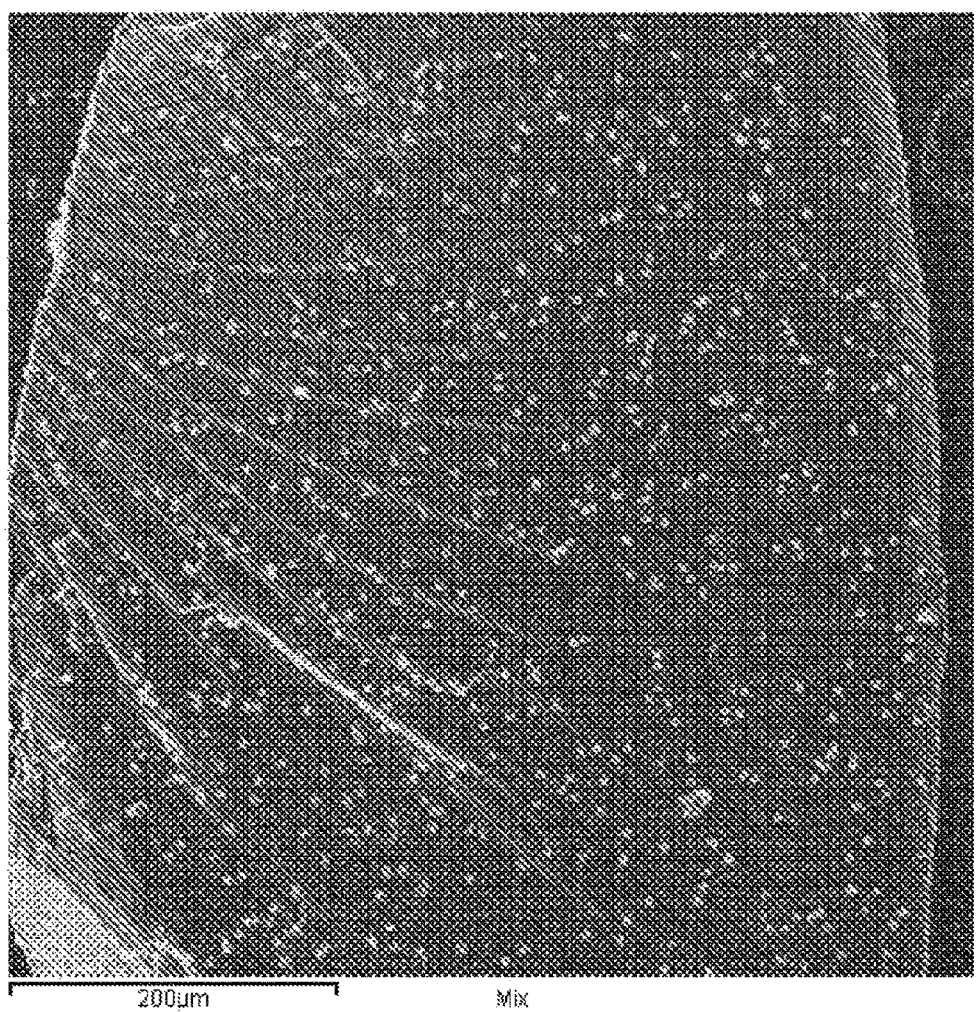
FIG. 4D illustrates the SEM-EDX silicon mapping of modified acrylate-based superabsorbent sample, according to an implementation of the present disclosure.

FIG. 4D illustrates the SEM-EDX silicon mapping of SAP particles for acrylate-based superabsorbent sample code 4 of TABLE 1, which is modified in a spraying method with a ratio of acetone to water of 90:10.

Referring again to FIG. 4C and FIG. 4D, in the case of spraying method, samples which were treated by two different ratios of acetone to water in the treatment solution, were mapped and their mappings revealed that the homogenous crosslinking has been taken place. Despite readily availability of whole EPS reagent existed in the treatment solution in spraying method, silicon percentages detected on the surface were just 0.08% and 0.05% for sample code 3 of FIG. 4C and sample code 4 of FIG. 4D, respectively.

Another point in silicon mapping is investigating the dispersion of silicon from surface to the bulk of the SAP. For this purpose, the modified particles mainly with a particle size of above 500 μm were casted in epoxy, and after that the cross section of the sample was obtained by using liquid nitrogen.

Figure 5A:
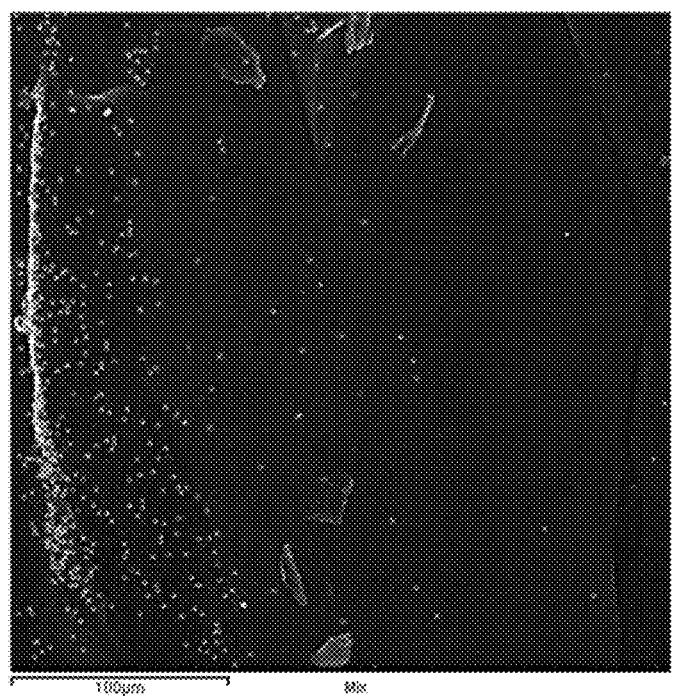
FIG. 5A illustrates the SEM image of cross section of modified acrylate-based superabsorbent sample, according to an implementation of the present disclosure.
Figure 5B:
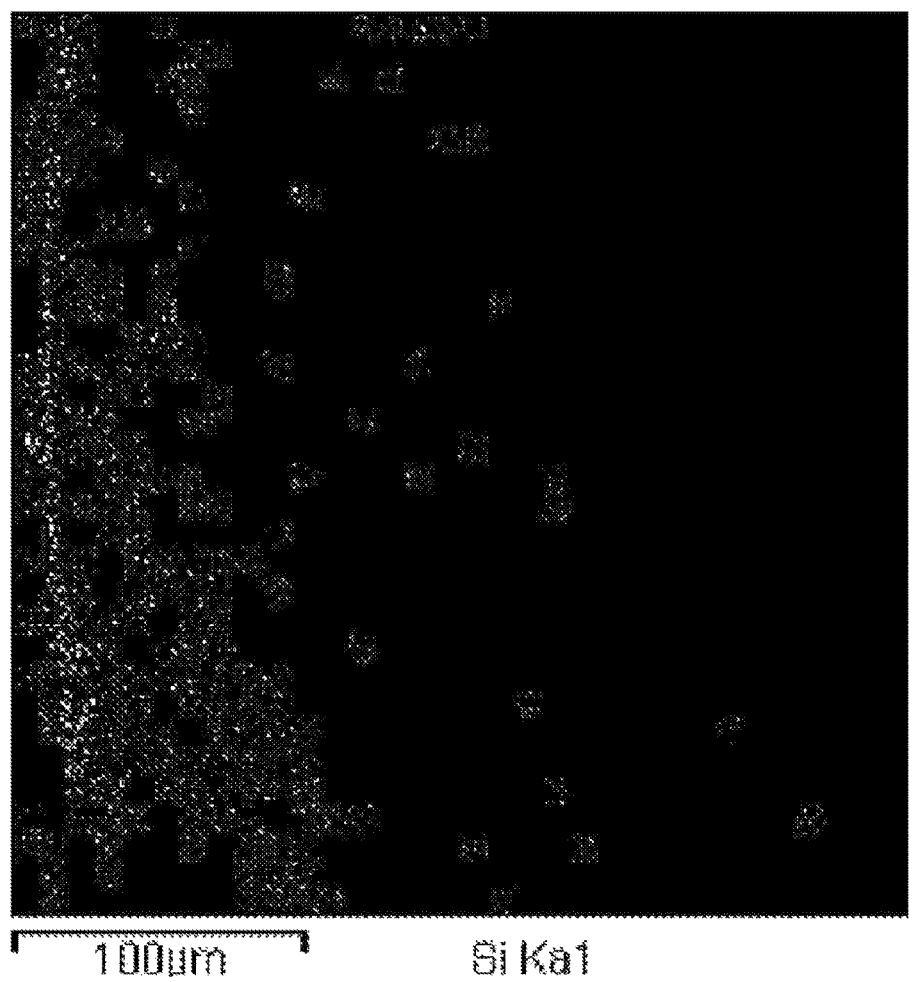
FIG. 5B illustrates the EDX mapping of silicon element for cross section of modified acrylate-based superabsorbent sample, according to an implementation of the present disclosure.

FIG. 5A illustrates the SEM image of modified acrylate-based superabsorbent particles of sample code 2 with a particle size of more than 500 μm, which were casted in an epoxy resin. FIG. 5B illustrates the EDX mapping of silicon element for modified acrylate-based superabsorbent particles of sample code 2 with a particle size of more than 500 µm, which were casted in an epoxy resin.

Referring to FIG. 5A and FIG. 5B, acrylate-based superabsorbent particles have a clear variation of silicon concentration from surface to the bulk. The surface of superabsorbent particle with a high concentration of silicon is clearly obvious in this image. Pre-hydrolysis and consequently condensation process of the epoxy silane (EPS) limit the diffusion of the epoxy silane reagent into the bulk of the superabsorbent particles; therefore, only surfaces of the particles are exposed to the reagent diffusion, and they form core-shell-like structures.

Figure 5C:
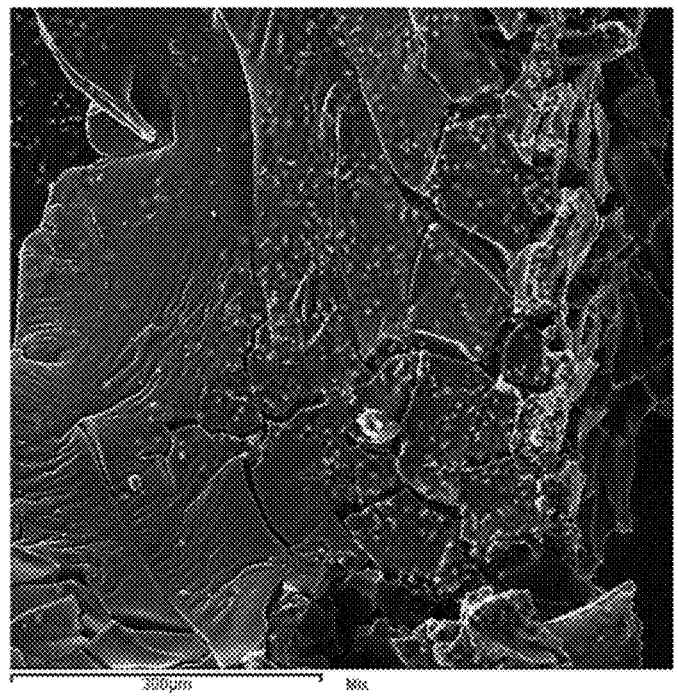
FIG. 5C illustrates the SEM image of a cross section of modified acrylate-based superabsorbent sample, according to an implementation of the present disclosure.

FIG. 5C illustrates the SEM image of a cross section of the acrylate-based superabsorbent particles of sample code 2 of TABLE 1, which were swollen to about half of their equilibrium absorbency in deionized water (DW), sliced and dried at about 50° C., with a particle size of about 500 µm.

Figure 5D:
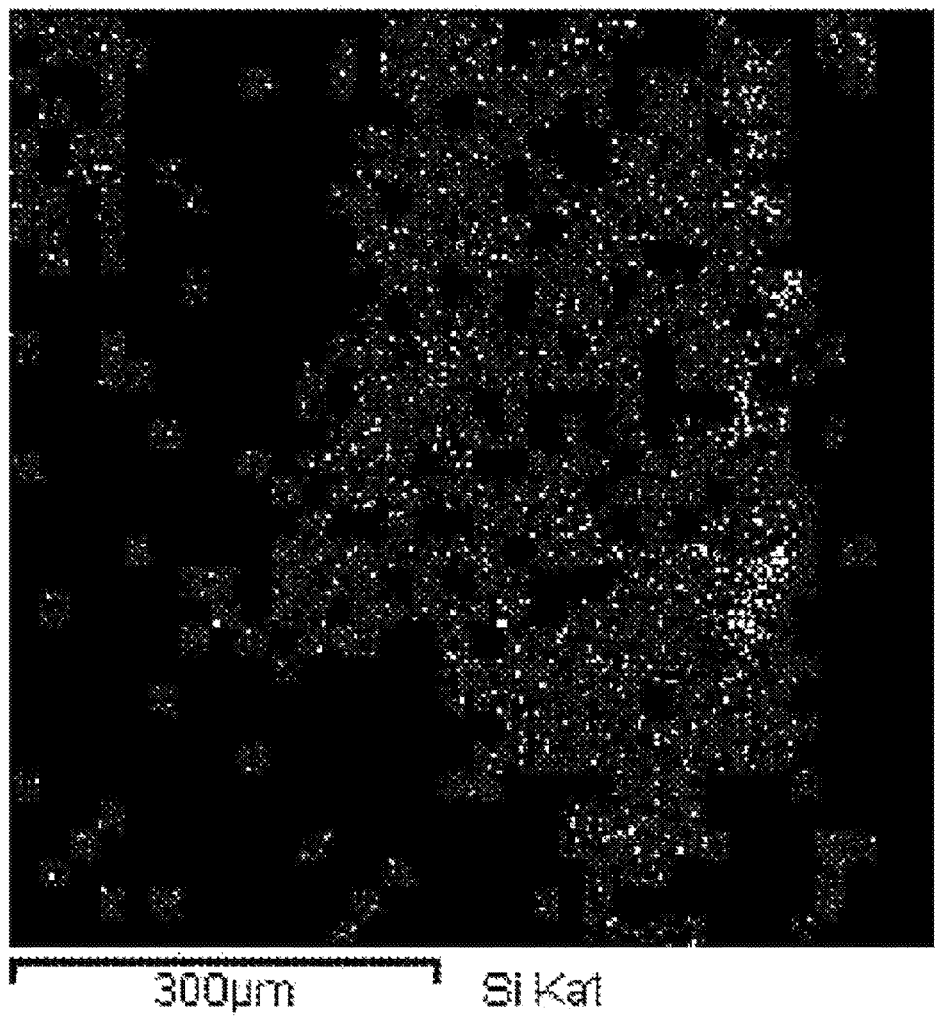
FIG. 5D illustrates the EDX mapping of silicon element for modified acrylate-based superabsorbent sample, according to an implementation of the present disclosure.

FIG. 5D illustrates the EDX mapping of silicon element for modified acrylate-based superabsorbent particles of sample code 2 of TABLE 1, which were swollen to about half of their equilibrium absorbency in deionized water (DW), sliced and dried at about 50° C. with a particle size of more than 500 µm, with a particle size of about 500 µm.

Referring to FIG. 5C and FIG. 5D, the silicon density clearly changes from surface to the bulk of the modified acrylate-based superabsorbent particles of sample code 2 of TABLE 1. The fractures which are made by swelling and drying are obvious; and on the surface of the particles where the silicon content is the most, the cracks are the most as well Example 5: Investigating the Residual Monomers Heating could promote the crosslinking reactions and enhance storage modulus. Nevertheless, it may increase side reactions like acrylic acid monomer elimination from its dimer residue of the SAP chains. The trace dimer may be thermally cleaved in the course of heating of the mixture for fabricating a modified acrylate-based superabsorbents. As a result, free monomer will be released and increase of the level of residual monomer.

In hygienic applications, effects of improvement processes of superabsorbents on residual monomer content has been investigated very strictly. Surface crosslinking is mostly carried out through heating the SAP and treatment solution mixture; and it should be considered that heating of a SAP and treatment solution mixture has undesirable effects on its properties. Therefore, the optimum condition for surface treatment of superabsorbents can be achieved through investigation of the treatment conditions on the swelling properties as well as the residual monomer content.

As described in the previous paragraph, residual monomer content is a limiting factor for hygienic acrylic-based SAPs; therefore, in this example, the effect of surface treatment of the acrylate-based superabsorbents on the residual monomer content was investigated. The residual monomer content was determined by using high performance liquid chromatography (HPLC).

The HPLC analysis was conducted using a Waters Model 510 system (Milford, Mass., USA). Solution preparation and calibration were standardized through the following steps. In order to standardize the solution preparation, a stock solution containing 10.0 milligram/milliliter acrylic acid was prepared in the mobile phase of ortho-phosphoric acid aqueous solution with a concentration of about 0.01% (volume/volume).

Also for standardizing the calibration, the calibration standards were prepared by appropriate quantitative dilution from the stock solution with the mobile phase; finally the calibration was standardized and the reported $R^2$ was 0.9949.

After that, for sample preparation, amount of about 100 milligram of the hydrogel beads were extracted through 2 hours of stirring with the mobile phase. The stirring velocity was about 1000 round per minute (RPM), and the amount of the mobile phase was about 50 milliliter; then, the samples were centrifuged at 8500 RPM for about 30 minutes; and afterward, the supernatant was injected into the HPLC system.

Figure 6:
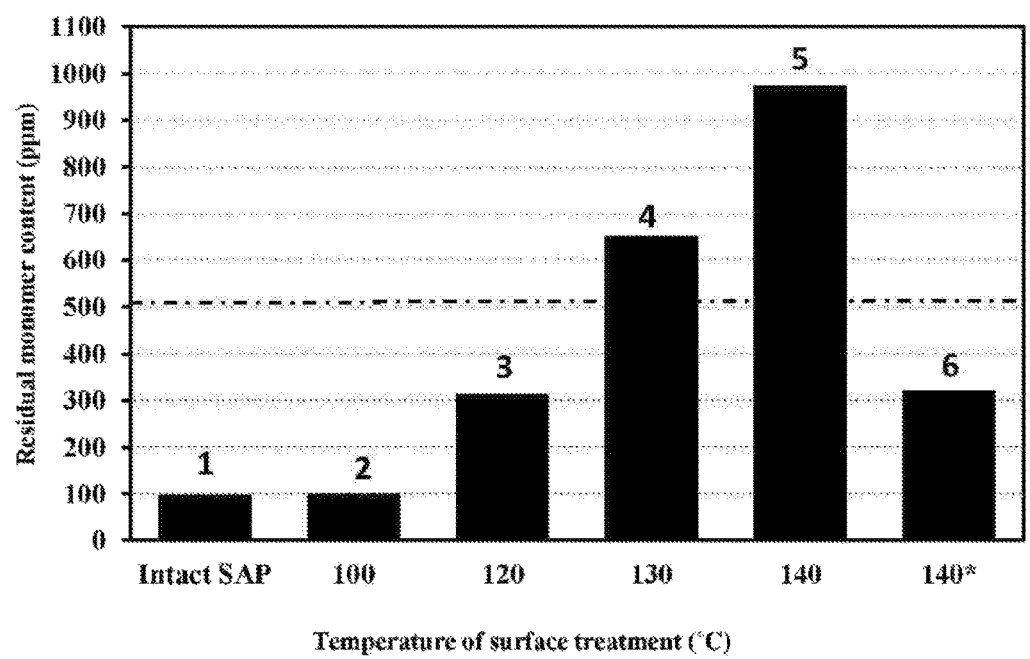
FIG. 6 illustrates the residual monomer content versus heating temperature, according to an implementation of the present disclosure.

FIG. 6 illustrates the residual monomer content versus heating temperature of six acrylate-based superabsorbent samples, and it shows the effect of surface treatment on residual monomer content at different temperatures and times. Referring to FIG. 6, all samples were heated for about 2 hours, except for sample 6 which was heated about 30 minutes at a temperature of 140° C. Also, dashed line shows the upper accepted limit for the residual monomer content of hygienic grades of SAPs, which is about 500 part per million (ppm); therefore, all samples except sample 4 and sample 5 have an acceptable residual monomer content according to hygienic grades of SAPs.

Example 6: Fourier Transform Infrared Spectroscopy (FTIR)

In this example, the possible reactions of the EPS were followed by an attenuated total reflection FTIR (ATR-FTIR) spectra. The FTIR spectra were taken on Bruker Instrument (Vertex 80, Germany), and the ATR (Miracle, diamond, 45°) were employed to probe the surface of the SAP particles. They were obtained in the wavenumber with a range of 600-4000 $cm^{-1}$ at a resolution of 1 $cm^{-1}$.

Figure 7:
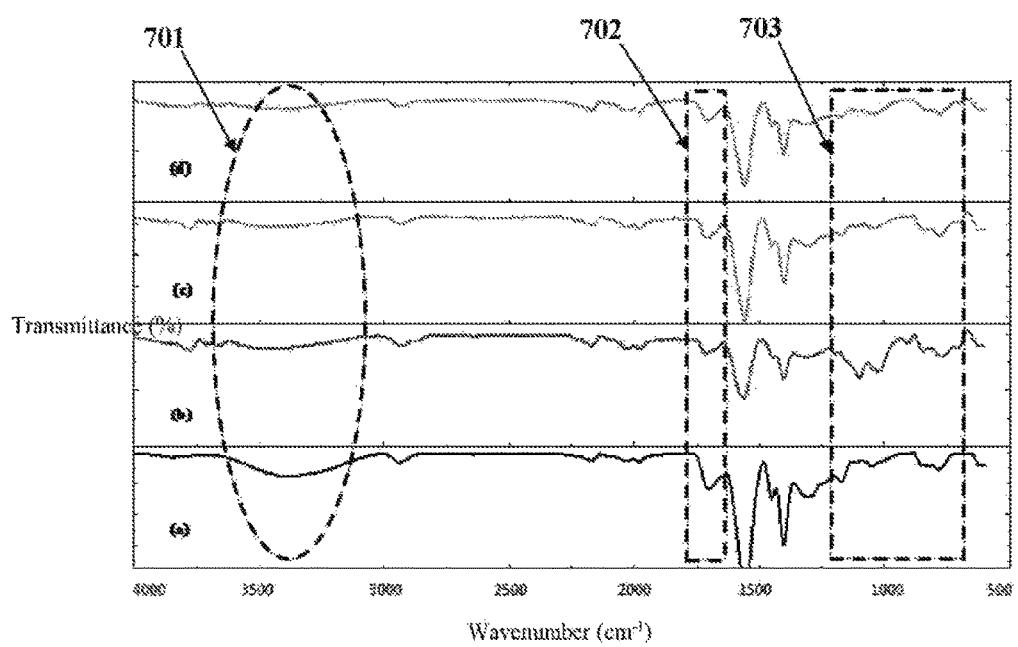
FIG. 7 illustrates ATR-FTIR spectra of the modified samples with different treatment method, according to an implementation of the present disclosure.

FIG. 7 illustrates ATR-FTIR spectra of the acrylate-based superabsorbent samples. The spectra show the transmittance percentage versus the wavenumber of four samples which are intact acrylate-based superabsorbent of sample code 1 in TABLE 1 designated as (a), modified acrylate-based superabsorbent sample of sample code 2 in TABLE 1 designated as (b), modified acrylate-based superabsorbent of sample code 3 in TABLE 1 designated as (c), modified acrylate-based superabsorbent of sample code 4 in TABLE 1 designated as (d).

The sample (b) was modified in a soaking method, and the samples (c) and (d) were modified in a spraying method. Also, the concentration ratio between water and acetone was about 70:30 (wt/wt) in sample (c), while it was about 90:10 (wt/wt) in sample (d).

Referring to FIG. 7, as shown in the spectral area of 701 at wavenumbers between 2500 $cm^{-1}$ and 3500 $cm^{-1}$, the intensity of OH band has been gently decreased which is an evidence for presence of alcohols and silanols and consuming carboxylic acids. Also, as shown in the spectral area of 702, the carbonyl band of intact sample (a) is shifted from 1701 $cm^{-1}$ to 1706 $cm^{-1}$, 1711 $cm^{-1}$ and 1718 $cm^{-1}$ for samples (d), (c) and (b), respectively as a result of surface modification. Also, the most movement belongs to the soaking method which is applied to the sample (b).

These shifts are assigned to formation of the ester bonds in the acrylate-based superabsorbent particles after 2 hours of heating at a temperature of 140° C. via the opening of the oxirane ring upon the nucleophilic attack of COOH or COO⁻; therefore, this shift indicates consuming carboxyl functional groups of acrylic acids of SAPs, and creating a linkage between the SAPs and epoxy or silanol groups. As a result, the esterification reaction in order to surface cross-linking has certainly occurred.

Also, a few unreacted silanol groups would surround C=O groups by hydrogen bonding networks and the OH groups of unreacted silanol groups will be consumed in further reactions such as creation of oligo siloxane species which have wavenumbers of about 1100 $cm^{-1}$ and 1026 $cm^{-1}$. Also, the peak at a wavenumber of 700 $cm^{-1}$ is assigned to a condensed siloxane network, whereas the uncondensed silanol groups have peaks at wavenumbers of 844 $cm^{-1}$ and 907 $cm^{-1}$.

Referring again to FIG. 7 as shown in the spectral area of 703 as a fingerprint area, the fingerprint area of modified samples which are attributed to Si—O—Si bridges is very different from the intact control sample (a). The main changes relate to peaks at wavenumbers of 1026 $cm^{-1}$ and 1100 $cm^{-1}$ in sample (b) which is modified in the soaking method.

In samples of (c) and (d) which are modified in the spraying method, these bands of Si—O—Si bridges are at a wavenumbers of 1100 $cm^{-1}$ and 1146 $cm^{-1}$ for sample (c), and about 1100 $cm^{-1}$ and 1147 $cm^{-1}$ for sample (d). It can be understood that these bands have become closer to each other in comparison with sample (a), which is attributed to smaller oligomeric siloxane moieties including dimers and trimers.

The difference in the bands of Si—O—Si bridges can illustrate different structures of siloxane networks owing to different ways of EPS hydrolysis. Regarding bands of Si—O—Si bridges, by comparing sample (a) spectrum with spectra of samples (c) and (d), these bands in sample (a) spectrum have higher intensities, so it can be concluded that using soaking method for applying the treatment solution to the acrylate-based superabsorbents results more condensation reaction during heating.

As a result, the esterification reaction for surface cross-linking has certainly occurred. Meanwhile, larger water content and using soaking method for applying treatment solution to the acrylate-based superabsorbent particles have led to more condensation reaction and oligo siloxane formation during heating.

Example 7: Wettability of the Acrylate-Based Superabsorbents

In this example wettability of the acrylate-based superabsorbent samples was determined by measuring the contact angle of a water droplet on their surface in the sessile drop technique. These measurements were done by using a contact angle goniometer (G10, Krüss, Germany) and an optical subsystem to capture the profile of a pure liquid on a solid substrate.

The samples were prepared by pressing the SAP powder under a pressure of about 10 bar. High resolution cameras (Sony) and software (DSA) were employed to instantly capture and analyze the contact angle. Each sample was measured in triplicate and the contact angle of each sample was reported by average.

Figure 8A:
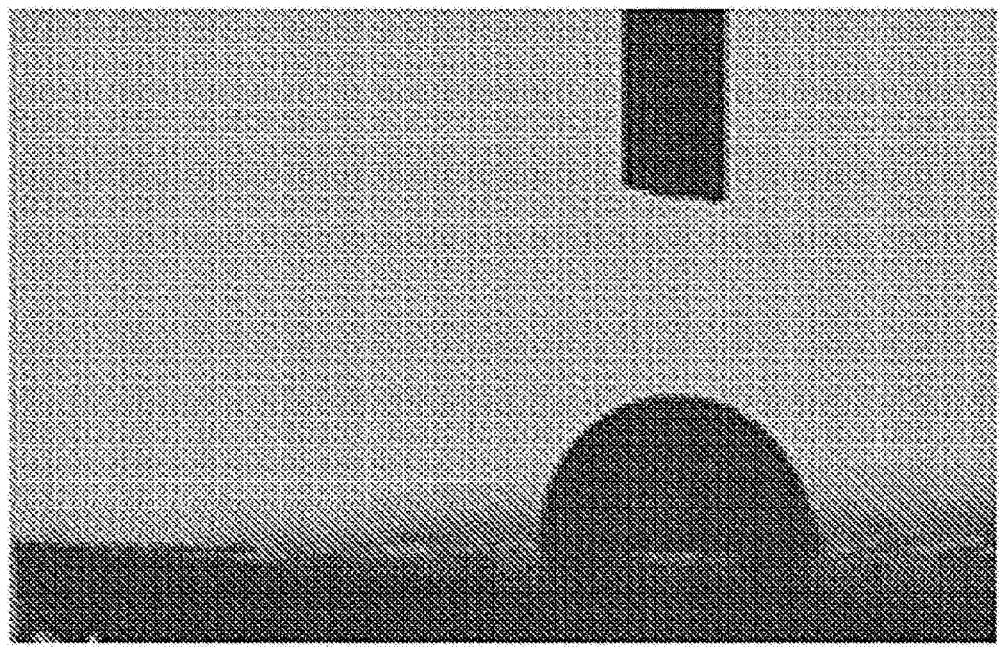
FIG. 8A illustrates the optical image of the drop on the intact acrylate-based superabsorbent sample, according to an implementation of the present disclosure.
Figure 8B:
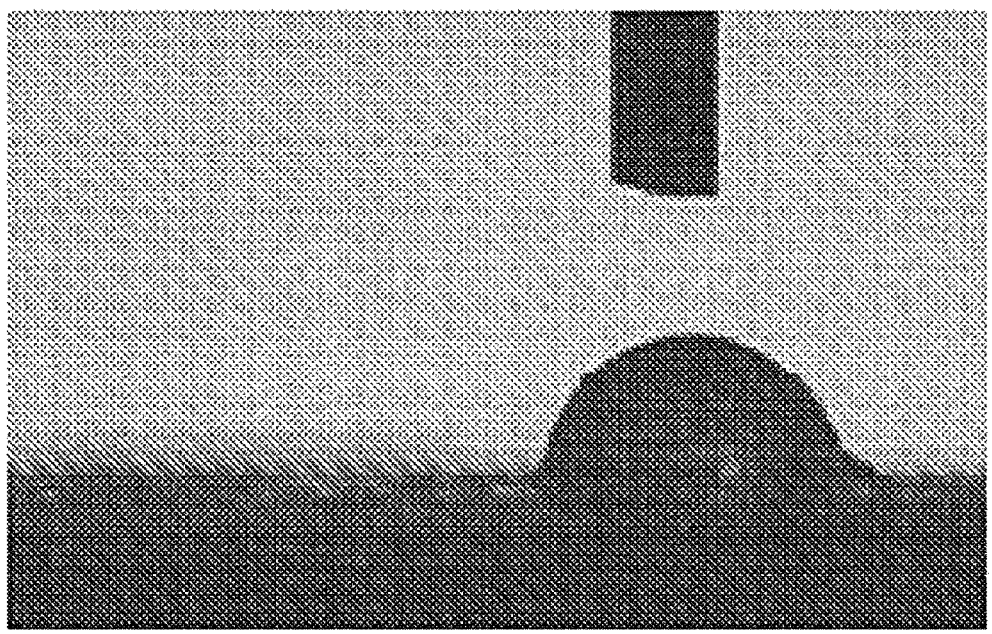
FIG. 8B illustrates the optical image of the drop on the modified acrylate-based superabsorbent sample, according to an implementation of the present disclosure.
Figure 8C:
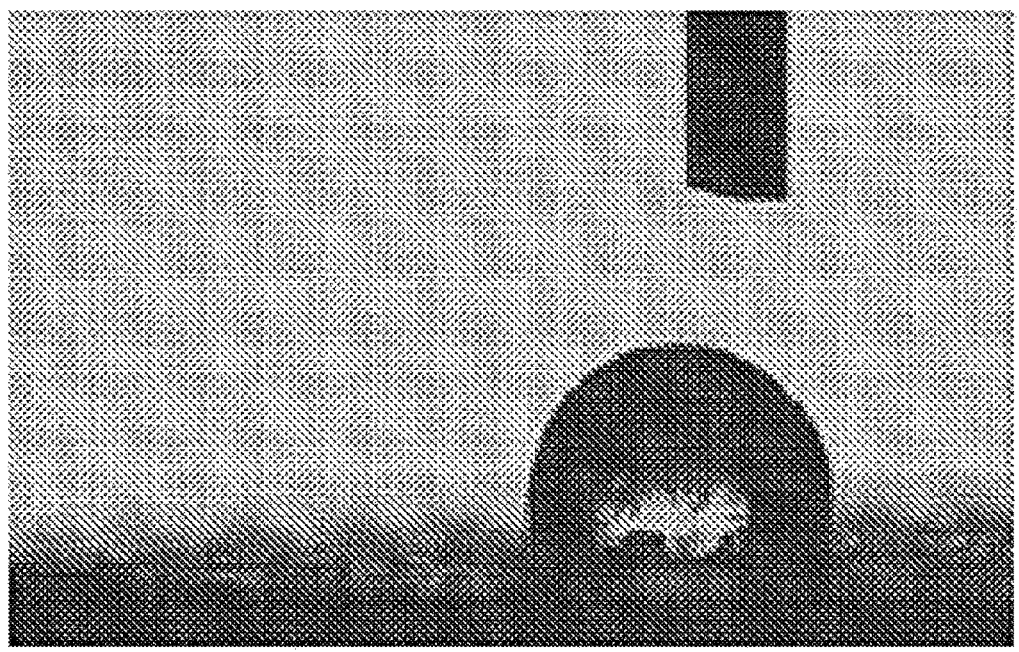
FIG. 8C illustrates the optical image of the drop on the modified acrylate-based superabsorbent sample, according to an implementation of the present disclosure.

FIG. 8A illustrates the optical image of the drop on the intact acrylate-based superabsorbent sample, which has an average contact angle of about 104.5. FIG. 8B illustrates the optical image of the drop on the modified acrylate-based superabsorbent sample, which was treated with EPS in a soaking method. This sample has an average contact angle of about 80.3; and FIG. 8C illustrates the optical image of the drop on the modified acrylate-based superabsorbent sample, which was treated with EPS in a spraying method. This sample has an average contact angle of about 114.5.

Referring to FIG. 8A, FIG. 8B, and FIG. 8C, the unmodified sample of FIG. 8A shows fairly hydrophobic character as its contact angle is above 90°. In addition, by rise of cross-link density in the modified acrylate-based superabsorbent sample of FIG. 8C which was treated with EPS in a spraying method, the surface becomes more hydrophobic than that of intact sample.

However, as displayed in FIG. 8B, the modified acrylate-based superabsorbent sample which was treated with EPS in a soaking method has an IPN of poly siloxane with lots of silanol groups; therefore, this sample possesses more hydrophilic characteristics, and presence of feet next to the drops shows better wettability. Furthermore, this IPN-like network formation would definitely alter the surface chemistry of post-treated SAP particles and consequently wetting behavior, while this sample has a lower average of contact angle than other samples.

Treating the surface of the acrylate-based superabsorbent samples with method of the present disclosure provides modified samples with different contact angle (CA), which alter the hydrophobicity of these samples; therefore, this property can be helpful in controlling gel-blockage phenomenon.

Figure 9:
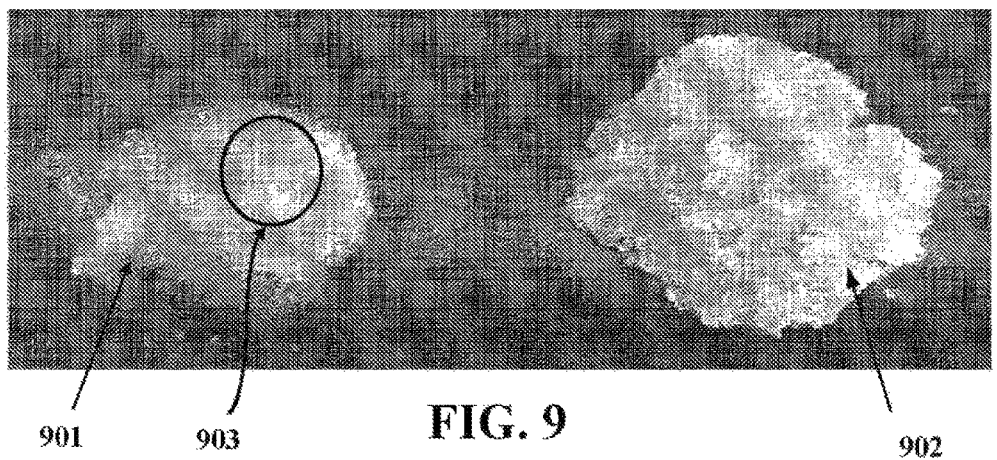
FIG. 9 illustrates the optical image of the intact acrylate-based superabsorbent sample and modified acrylate-based superabsorbent sample after saline-absorption under load, according to an implementation of the present disclosure.

The gel-blocking phenomenon occurs when the outer surfaces of intact SAP particles swell too quickly and form a clump; so they prevent the convection of the liquid into the interior particles and lead to reduce the absorption rate and capacity. FIG. 9 illustrates the optical image of the intact acrylate-based superabsorbent sample 901 and modified acrylate-based superabsorbent sample 902 after saline-absorption under load.

Referring to FIG. 9, there are obvious differences between intact acrylate-based superabsorbent sample 901 and modified acrylate-based superabsorbent sample 902 after under load swelling in saline solution. Totally swollen individual particles are observed for the modified sample 902, whereas an extended gel blockage as clump 903 is obvious for the intact sample 901.

This means that when a pressure was applied on the intact acrylate-based superabsorbent sample 901, saline solution was not absorbed effectively in these areas, because semi-swollen SAP particles made the blockage in these areas and prevented further liquid being absorbed by dry SAP underneath. On the other hand, there is not any gel-blocked particles in the modified acrylate-based superabsorbent sample 902; therefore, it shows that the surface treatment of the present disclosure successfully prohibits the undesirable gel blocking phenomenon.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for surface treatment of superabsorbents, the method comprising:
preparing a treatment solution including water, an organic solvent, and an epoxy silane compound;
applying the treatment solution to a plurality of acrylate-based superabsorbents to form a mixture; and,
applying heat or microwave irradiation to the mixture for fabricating modified acrylate-based superabsorbents.

2. The method according to claim 1, wherein the treatment solution further comprises an additive.

3. The method according to claim 2, wherein the additive is selected from the group consisting of aluminum sulfate, aluminum chloride, benzyl amine compounds, imidazole compounds, methyl imidazole, dimethyl octadecyl [3-(tri methoxysilyl)propyl] ammonium chloride, aniline compounds, p-toluene sulfonic acid, sodium hypophosphite, and combinations thereof.

4. The method according to claim 2, wherein the additive is present in an amount of between 0.001% and 1% of the weight of the superabsorbent.

5. The method according to claim 1, wherein the superabsorbents are acrylate-based superabsorbents.

6. The method according to claim 1, wherein the superabsorbents are one of porous superabsorbents, non-porous superabsorbents, and combinations thereof.

7. The method according to claim 1, wherein the organic solvent is selected from the group consisting of acetone, ethanol, methanol, dimethyl sulfoxide (DMSO), dimethyl formamide (DMF), and combinations thereof.

8. The method according to claim 1, wherein the epoxy silane compound is selected from the group consisting of 3-[(2, 3-epoxypropoxy)-propyl]-trimethoxy silane, 3-glycidyloxy propyl triethoxy silane, 3-glycidyloxy propyl trimethoxy silane, 3,4 epoxy cyclohexyl-ethyl trimethoxy silane, glycidoxy propyl-trimethoxy silane r-glycidoxy propyl-methyli diethoxy silane, and combinations thereof.

9. The method according to claim 1, wherein the concentration ratio (weight/weight) of water and organic solvent is between 5:95 (wt/wt) and 50:50 (wt/wt).

10. The method according to claim 1, wherein the concentration ratio (weight/weight) of the silane compound and the superabsorbents is between 0.1:1 (wt/wt) and 1:100 (wt/wt).

11. The method according to claim 1, wherein the applying step includes applying heat to the mixture for fabricating modified acrylate-based superabsorbents.

12. The method according to claim 11, wherein applying the heat includes using an oven at a temperature of about between 25° C. and 100° C., and for a duration of about between 15 minutes and 3 hours.

13. The method of claim 1, wherein the applying step includes applying microwave irradiation to the mixture for fabricating modified acrylate-based superabsorbents.

14. The method of claim 13, wherein applying the microwave radiation includes applying the microwave radiations using a microwave oven with a power of at most 1000 Watt, and a duration of about between 2 minutes and 15 minutes.

* * * * *